William H. Christie's Saw Tooth Cutter.
No. 71455
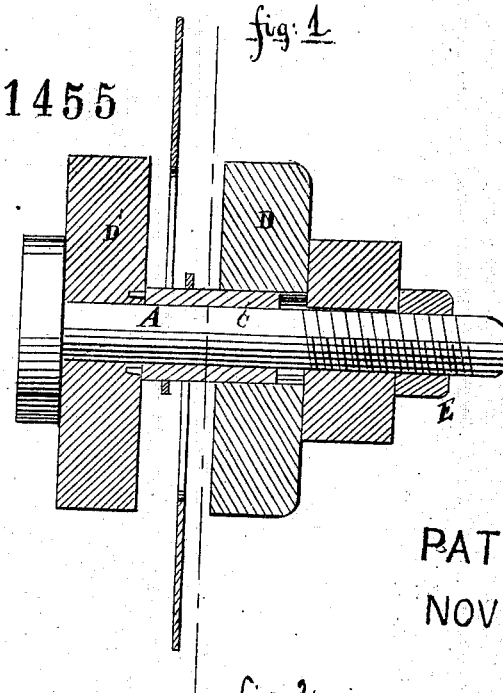
fig. 1
PATENTED
NOV 26 1867
fig. 2
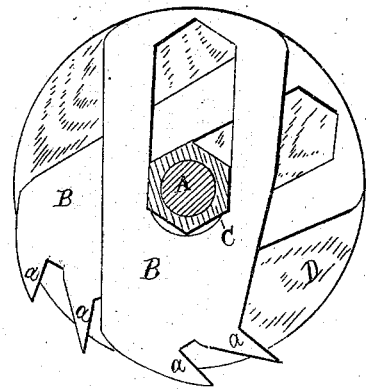
Witnesses
A. N. Marr
A. A. Yeatman
Inventor
Wm. H. Christie
per
Alexander ~~~

United States Patent Office.

WILLIAM H. CHRISTIE, OF ALBANY, NEW YORK, ASSIGNOR TO HIMSELF AND WILLIAM H. BURTON.

Letters Patent No. 71,455, dated November 26, 1867.

IMPROVEMENT IN CUTTER-HEADS FOR PLANING-MACHINES.

The Schedule referred to in these Letters Patent and making part of the same.

TO ALL WHOM IT MAY CONCERN:

Be it known that I, WILLIAM H. CHRISTIE, of Albany, in the county of Albany, and in the State of New York, have invented certain new and useful Improvements in Moulding-Cutters; and do hereby declare that the following is a full, clear, and exact description thereof, reference being had to the accompanying drawings, and to the letters of reference marked thereon.

In the annexed drawings, making part of this specification, A represents a mandrel, which is provided with the heads D D', and which has slipped over and secured fast to it a hexagonal collar, C. B B represent a series of metallic plates, which are provided at one end with the saw-teeth $a\ a$. These plates are provided also with slots made longitudinally of them, and just wide enough to fit snugly over the collar C and against two sides of it, as seen in Figure 2. The plates B, after being placed over the collar C, are secured between the heads D D' by means of a nut, E, which passes over a thread on the end of the mandrel. By using a series of these plates B with cutting teeth a variety of work may be performed. By adjusting the plates, their cutting teeth may be fitted to almost any pattern for cutting mouldings or oval frames for pictures and looking-glasses, or may be used for cutting tongues and grooves wherever necessary. The mandrel may be made of any desired shape, so as to confine the plates and keep them from slipping while being set to a pattern, and also more firmly in position while performing their work.

Having thus fully described my invention, what I claim as new, and desire to secure by Letters Patent, is—

A cutter for forming mouldings, when formed of a series of plates, B, each having cutting teeth, $a\ a$, and an elongated slot in which is the mandrel, and upon it the plate can be adjusted, so as to cut any desired shape of moulding, substantially as described.

In testimony that I claim the foregoing, I have hereunto set my hand this, 20th day of June, 1867.

WM. H. CHRISTIE.

Witnesses:
    WM. H. BURTON,
    JOHN N. FOSTER.